J. Nasmyth.
Forging Hammer.
No 82. A. I. Patented Apr. 24, 1847.
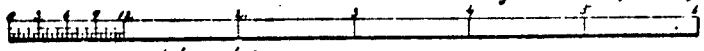
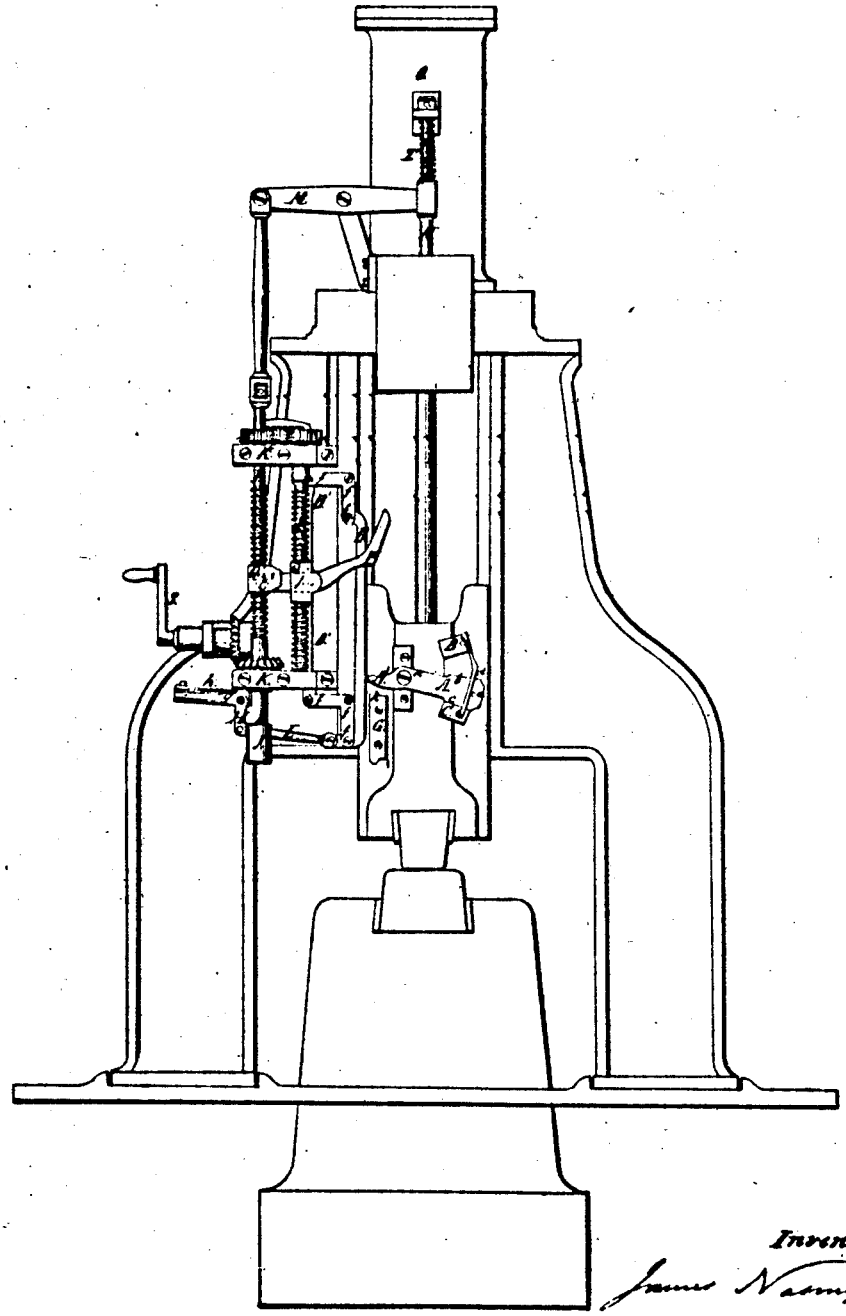
Inventor.
James Nasmyth.
H. PETERS, PHOTO-LITHOGRAPHER, WASHINGTON, D. C.